(12) United States Patent
Halasa et al.

(10) Patent No.: US 7,189,792 B2
(45) Date of Patent: Mar. 13, 2007

(54) CATALYST FOR SYNTHESIZING HIGH TRANS POLYMERS

(75) Inventors: Adel Farhan Halasa, Bath, OH (US); Wen-Liang Hsu, Cuyahoga Falls, OH (US); Chad Aaron Jasiunas, Copley, OH (US); Laurie Elizabeth Austin, Hartville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 11/311,495

(22) Filed: Dec. 19, 2005

(65) Prior Publication Data

US 2006/0149010 A1 Jul. 6, 2006

Related U.S. Application Data

(60) Provisional application No. 60/640,670, filed on Dec. 31, 2004.

(51) Int. Cl.
*C08F 4/50* (2006.01)
*C08F 36/06* (2006.01)

(52) U.S. Cl. .................. 526/175; 526/176; 526/177; 526/181; 502/154

(58) Field of Classification Search ............... 526/175, 526/176, 177, 181; 502/153, 154, 155, 156
See application file for complete search history.

(56) References Cited

U.S. PATENT DOCUMENTS

| 4,225,690 | A |   | 9/1980 | Halasa et al. ............. 526/183 |
| 4,996,273 | A | * | 2/1991 | Van Der Huizen ......... 526/177 |
| 5,086,136 | A | * | 2/1992 | Takashima et al. ......... 526/177 |
| 5,089,574 | A |   | 2/1992 | Castner ..................... 526/142 |
| 5,100,965 | A |   | 3/1992 | Hsu et al. .................. 525/249 |
| 5,448,002 | A |   | 9/1995 | Castner ..................... 526/140 |
| 5,854,351 | A |   | 12/1998 | Maier et al. ............... 525/197 |
| 6,627,715 | B2 | * | 9/2003 | Halasa et al. ............. 526/177 |
| 6,670,435 | B2 | * | 12/2003 | Hsu et al. .................. 526/175 |
| 2002/0086961 | A1 |   | 7/2002 | Hsu et al. .................. 526/173 |
| 2002/0183469 | A1 |   | 12/2002 | Halasa et al. ............. 526/173 |
| 2003/0153698 | A1 |   | 8/2003 | Halasa et al. ............. 526/173 |
| 2004/0044202 | A1 |   | 3/2004 | Halasa et al. ............. 540/612 |

FOREIGN PATENT DOCUMENTS

EP    0 391 692 A    10/1990

* cited by examiner

*Primary Examiner*—Fred Teskin
(74) *Attorney, Agent, or Firm*—Alvin T. Rockhill

(57) ABSTRACT

The process and catalyst of this invention can be utilized to synthesize homo and copolymers of conjugated diene monomers and vinyl aromatic monomers having high trans contents of greater than 60% with low melting points. These homo and copolymers of conjugated diene monomers and vinyl aromatic monomers can be utilized in tire tread and sidewall rubbers that exhibit outstanding wear and tear characteristics in the tread and excellent flexing properties in the sidewall. The rubber polymers of this invention are made utilizing an improved catalyst system. This catalyst system is comprised of (a) organo aluminum compounds, (b) organo lithium compounds, (c) a barium compound selected from barium salts of (i) di(ethylene glycol) ethyl ether, (ii) di(ethylene glycol) propyl ether, (iii) di(ethylene glycol) hexyl ether, (iv) di(N,N-dimethyl amino glycol) ethyl ether, (v) menthol and thymol in the presence of polar modifier consisting of water, alcohols, amines, thiols, phosphates and phosphites. The trans polymers and copolymers of this invention made with the above catalyst system typically have a glass transition temperature ranging from −97° C. to −40° C., a melt temperature ranging from −30° C. to +30° C., and a number average molecular weight from 20,000 to 250,000. The inclusion of such polar modifiers in the barium catalyst system results in a high styrene content in copolymerization, a high trans content, and high molecular weight. Copolymers of conjugated diolefin monomers and vinyl aromatic monomers made with the catalyst system of this invention also have a tapered macrostructure.

15 Claims, 1 Drawing Sheet

CATALYST FOR SYNTHESIZING HIGH TRANS POLYMERS

This application claims the benefit of U.S. Provisional Patent Application Ser. No. 60/640,670 filed on Dec. 31, 2004.

BACKGROUND OF THE INVENTION

By virtue of its high level of crystallinity, trans-1,4-polybutadiene (TPBD) is typically a thermoplastic resin. Because it contains many double bonds in its polymeric backbone, TPBD can be blended and cocured with rubber. TPBD is similar to syndiotactic-1,2-polybutadiene in this respect. Even though trans-1,4-polybutadiene having a high melting point is a thermoplastic resin, it becomes elastomeric when cured alone or when cocured with one or more rubbers.

Good molecular weight control can normally be achieved by utilizing an anionic polymerization system to produce TPBD. There is typically an inverse relationship between the catalyst level utilized and the molecular weight attained when anionic polymerization systems are used. Such an anionic polymerization system is disclosed in U.S. Pat. No. 4,225,690. The catalyst system disclosed therein is based on a dialkylmagnesium compound which is activated with a potassium alkoxide. However, such catalyst systems have not proven to be commercially successful.

TPBD is normally prepared utilizing transition metal catalysts or rare earth catalysts. The synthesis of TPBD with transition metal catalysts is described by J. Boor Jr., "Ziegler-Natta Catalysts and Polymerizations," Academic Press, New York, 1979, Chapters 5–6. The synthesis of TPBD with rare earth catalysts is described by D. K. Jenkins, Polymer, 26, 147 (1985). However, molecular weight control is difficult to achieve with such transition metal or rare earth catalysts and monomer conversions are often very modest.

Japanese Patent Application No. 67187-1967 discloses a catalyst system and technique for synthesizing TPBD consisting of 75 to 80 percent trans-1,4-structure and 20 to 25 percent 1,2-structure. The catalyst system described by this reference consists of a cobalt compound having a cobalt organic acid salt or organic ligand, an organoaluminum compound and phenol or naphthol. Gel formation is a serious problem that is frequently encountered when this three-component catalyst system is utilized in the synthesis of TPBD. Gelation is a particularly serious problem in continuous polymerizations. By utilizing this catalyst system and technique, TPBD can be synthesized in a continuous process with only minimal amounts of gel formation.

U.S. Pat. No. 5,089,574 is based upon the finding that carbon disulfide will act as a gel inhibitor in conjunction with three component catalyst systems which contain an organocobalt compound, an organoaluminum compound and a para-alkyl substituted phenol. U.S. Pat. No. 5,089,574 also indicates that conversions can be substantially improved by utilizing para-alkyl substituted phenols which contain from about 12 to about 26 carbon atoms and which preferably contain from about 6 to about 20 carbon atoms.

U.S. Pat. No. 5,089,574 more specifically reveals a process for synthesizing trans-1,4-polybutadiene in a continuous process which comprises continuously charging 1,3-butadiene monomer, an organocobalt compound, an organoaluminum compound, a para-substituted phenol, carbon disulfide and an organic solvent into a reaction zone; allowing the 1,3-butadiene monomer to polymerize in said reaction zone to form the trans-1,4-polybutadiene; and continuously withdrawing the trans-1,4-polybutadiene from said reaction zone.

U.S. Pat. No. 5,448,002 discloses that dialkyl sulfoxides, diaryl sulfoxides and dialkaryl sulfoxides act as molecular weight regulators when utilized in conjunction with cobalt-based catalyst systems in the polymerization of 1,3-butadiene monomer into TPBD. U.S. Pat. No. 5,448,002 reports that the molecular weight of the TPBD produced decreases with increasing levels of the dialkyl sulfoxide, diaryl sulfoxide or dialkaryl sulfoxide present as a molecular weight regulator.

U.S. Pat. No. 5,448,002 specifically discloses a process for the synthesis of trans-1,4-polybutadiene which comprises polymerizing 1,3-butadiene monomer under solution polymerization conditions in the presence of at least one sulfoxide compound selected from the group consisting of dialkyl sulfoxides, diaryl sulfoxides and dialkaryl sulfoxides as a molecular weight regulator and in the presence of a catalyst system which includes an organocobalt compound, an organoaluminum compound and a para-alkyl substituted phenol.

In the polymerizations which utilize transition metal catalysts described in these prior art patents, molecular weight is typically difficult to control. Additionally, none of these prior art references describe systems that are suitable for the copolymerization of conjugated diene monomers with vinyl aromatic monomers or conjugated linear diene monomers with branched conjugated diene monomers.

The presence of residual cobalt in TPBD made with cobalt-based catalyst systems is not desirable. This is because the residual cobalt acts as a prooxidant leading to polymer instability during storage. This is a particular problem in cases where the TPBD is stored in a "hothouse" prior to usage, which is a standard procedure in many industries, such as the tire industry. In any case, high levels of residual cobalt in the TPBD lead to problems with polymer stability.

Unfortunately, carbon disulfide is typically required as a gel-reducing agent in the synthesis of TPBD with cobalt-based catalyst systems. This is particularly true in the case of continuous polymerization systems. However, the presence of carbon disulfide in such systems reduces the level of catalyst activity and generally makes it necessary to increase the level of cobalt in the catalyst system. Thus, in cases where carbon disulfide is required for gel control, the level of cobalt needed is further increased. This accordingly leads to greater polymer instability.

Due to its high melting point, it is normally necessary to heat TPBD in order for it to be processed using conventional mixing equipment, such as a Banbury mixer or a mill mixer. This heating step is typically carried out by storing the trans-1,4-polybutadiene in a "hothouse" for a few days prior to its usage. During this storage period, the bails of the polymer are slowly heated to a temperature above about 104° F. (40° C.). At such temperatures, the polymer can be readily processed in standard mixing equipment. However, the TPBD typically undergoes undesirable oxidative crosslinking which leads to gelation during this long heating period. This oxidation can crosslink the TPBD to such a high degree that it cannot be processed utilizing standard mixing techniques. In other words, the oxidative gelation that occurs can destroy the polymer.

U.S. Pat. No. 5,854,351 discloses that TPBD which contains a processing oil can be rapidly heated by radio frequency electromagnetic radiation. The radio frequency waves used in such a heating process typically have a frequency that is within the range of about 2 to 80 MHz (megahertz). By utilizing such a technique, an 80-pound (30 kg) bale of TPBD can be rapidly heated to a temperature above 104° F. (40° C.) in a matter of minutes. During this rapid heating process, oxidative gelation does not occur to a significant degree. This is, of course, in contrast to conventional heating techniques where bales of TPBD are slowly warmed by convection heating to the required temperature over a period of days. During this long heating period, the TPBD undergoes highly undesirable oxidative crosslinking.

U.S. Pat. No. 5,854,351 more specifically discloses a technique for mixing trans-1,4-polybutadiene with at least one rubbery polymer which comprises: (1) heating the trans-1,4-polybutadiene to a temperature which is within the range of 105° F. (41° C.) to 200° F. (93° C.) by exposing it to electromagnetic radiation having a frequency in the range of about 2 MHz to about 80 MHz, wherein the trans-1,4-polybutadiene is oil-extended with at least 10 phr of a processing oil; and (2) mixing the trans-1,4-polybutadiene with said rubbery polymer before any portion of the trans-1,4-polybutadiene cools to a temperature below 104° F. (41° C.).

U.S. Pat. No. 5,100,965 discloses a process for synthesizing a high trans polymer which comprises adding (a) at least one organolithium initiator, (b) an organoaluminum compound, (c) a barium alkoxide and (d) a lithium alkoxide to a polymerization medium which is comprised of an organic solvent and at least one conjugated diene monomer.

U.S. Pat. No. 5,100,965 further discloses that high trans polymers can be utilized to improve the characteristics of tire tread rubber compounds. By utilizing high trans polymers in tire tread rubber compounds, tires having improved wear characteristics, tear resistance and low temperature performance can be made.

The above mentioned patent which discloses the use of barium compounds and organo aluminum compounds in the presence of lithium compounds utilizes the barium salts that are made from barium metal in liquid ammonia in the presence of the alcohol.

In commercial applications where recycle is required, the use of barium alkoxides can lead to certain problems. For instance, barium t-amylate can react with water to form t-amyl alcohol during steam-stripping in the polymer finishing step. Since t-amyl alcohol forms an azeotrope with hexane, it co-distills with hexane and thus contaminates the feed stream.

SUMMARY OF THE INVENTION

This invention utilizes barium hydroxide which is a very inexpensive and safe material in a reaction with di(ethylene glycol) ether, di(ethylene glycol) propyl ether, di(N,N-dimethyl amine glycol) ethyl ether, and di(ethylene glycol) hexyl ether in an aromatic solvent. All of these barium salts are miscible in aromatic solvents. This invention also utilizes polar compounds, such as water, alcohols, amines, thiols, sulfides, phosphates and phosphites to (1) control reaction temperature, (2) increase the trans content of the polymer at higher temperatures, and (3) control the number average molecular weight and increase the weight average molecular weight of the polymer. Additionally, the vinyl aromatic monomers containing copolymers made with the catalysts of this invention have a tapered macrostructure.

This invention is based upon the discovery that the trans-microstructure content of polymers made with catalyst systems which are comprised of (a) an organolithium compound, (b) an organoaluminum compound, and (c) a barium salt of (i) di(ethylene glycol) ethyl ether (ii) di(ethylene glycol) propyl ether, (iii) di(N,N-dimethyl ethylene glycol) ethyl ether, (iv) di(ethylene glycol) hexyl ether in the presence of a polar modifier, such as water, a primary alcohol, a secondary alcohol, a tertiary alcohol, a cyclic primary, secondary or tertiary amine, a chelating diamine, a phosphate, a phosphate sulfide, sulfate, or a thiol. However, the catalyst systems of this invention will typically be void of amines.

By conducting the polymerization in the presence of such modifiers, monomer conversions and rates of polymerization are also increased. The problem of recycle stream contamination is solved by utilizing a barium salt of a cyclic alcohol as the barium compound in the catalyst system. Barium mentholate and barium di(ethylene glycol) ethers are highly preferred because they do not co-distill with hexane or form compounds during steam-stripping which co-distill with hexane. Since the boiling points of the cyclic alcohols generated upon the hydrolysis of their metal salts are very high, they do not co-distill with hexane and contaminate recycle streams. Additionally, such cyclic alcohols are considered to be environmentally safe. In fact, menthol (the hydrolyzed product of barium mentholate) is commonly used as a food additive.

The trans polymers, such as trans-1,4-polybutadiene and trans-styrene-butadiene rubber, made with such barium containing catalyst systems have a melting point that is within the range of about −30° C. to +30° C. Because the trans-1,4-polybutadiene portion of the polymer synthesized with the catalyst system of this invention has a high melting point, it does not need to be heated in a "hot-house" before it is blended with other rubbery polymers or utilized in making rubber products, such as tires. Additionally, the trans-1,4-polybutadiene is strain crystallizable and can be employed in manufacturing tire tread compounds that exhibit wear characteristics. The trans polymers and copolymers also typically have a glass transition temperature which is within the range of about −97° C. to about −40° C., a number average molecular weight which is within the range of about 30,000 to about 200,000, and a Mooney ML 1+4 viscosity which is within the range of about 20 to about 120.

The present invention more specifically discloses a catalyst system that is particularly useful for polymerizing conjugated diolefin monomers and optionally mixtures of conjugated diolefin monomers and vinyl aromatic monomers into rubbery polymers having a high trans content, said catalyst system being comprised of (a) an organolithium compound, (b) a barium compound selected from the group consisting of (i) barium salts of cyclic alcohols, such as barium mentholate and glycol ethers, and (ii) barium thymol, (c) an organoaluminum compound, and (d) a polar modifier selected from the group consisting of alcohols, amines, thiols, phosphates, phosphites and water.

The present invention further discloses a process for synthesizing trans-1,4-polybutadiene and copolymers of styrene and 1,3-butadiene which comprises polymerizing 1,3-butadiene monomer in the presence of a catalyst system which is comprised of (a) an organolithium compound, (b) a barium compound, (c) an organoaluminum compound, and (d) a polar modifier selected from the group consisting of alcohols, amines, thiols, phosphates, phosphites and water. Conducting the polymerization in the presence of 10 ppm to 100 ppm of water increases the level of styrene conversion and moderates the polymerization temperature. The polymerizations of this invention will typically be conducted in the presence of 20 ppm to 75 ppm of water.

DETAILED DESCRIPTION OF THE INVENTION

Figure 1:
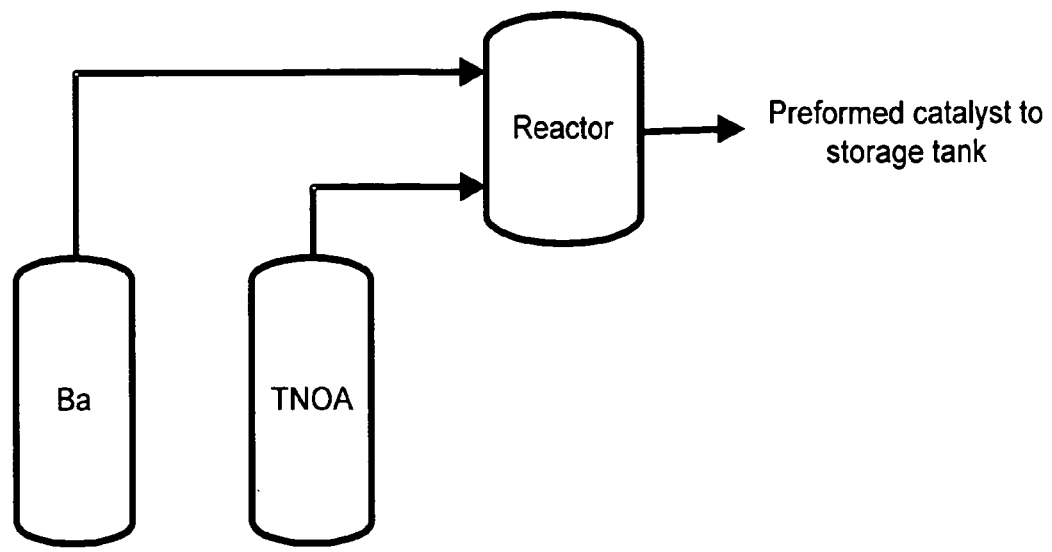
FIG. 1 is a schematic process flow diagram that depicts the process for making the preformed barium catalyst system utilized in Examples 11–20.

The polymerizations of the present invention will normally be carried out in a hydrocarbon solvent that can be one or more aromatic, paraffinic, or cycloparaffinic compounds. These solvents will normally contain from 4 to 10 carbon atoms per molecule and will be liquid under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, petroleum naphtha, and the like, alone or in admixture.

In the solution polymerizations of this invention, there will normally be from 5 to 30 weight percent monomer (1,3-butadiene and optionally styrene) in the polymerization medium. Such polymerization media are, of course, comprised of the organic solvent and the monomer. In most cases, it will be preferred for the polymerization medium to contain from 10 to 25 weight percent monomer. It is generally more preferred for the polymerization medium to contain 15 to 20 weight percent monomer.

The trans homopolymers and copolymers made utilizing the catalyst system and technique of this invention are comprised of repeat units that are derived from 1,3-butadiene. The trans polymers typically have a trans-microstructure content of about 60% to about 80%, based upon the butadiene portion of the copolymer. The trans polymers made in accordance with this invention exhibits a low polydispersity. The ratio of the weight average molecular weight to the number average molecular weight of such trans polymers will typically be less than 1.5. It is more typical for the ratio of the weight average molecular weight to the number average molecular weight of the trans polymers to be less than about 1.3. It is normally preferred for the high trans polymers of this invention to have a ratio of weight average molecular weight to number average molecular weight which is less than about 1.2.

The trans polymers made in accordance with this invention will typically have a melting point which is within the range of about −20° C. to about 40° C. They also typically have a glass transition temperature that is within the range of about −97° C. to about −40° C.

The polymerizations of this invention are initiated by adding an organolithium initiator, an organoaluminum compound, and a barium salt of a cyclic alcohol to a polymerization medium containing the conjugated diolefin monomer. Preferably, the polymerizations of this invention are initiated by pre-alkylated barium salts with an organoaluminum compound that is the barium salt of a cyclic alcohol, a di(ethylene glycol) ether, a di(ethylene glycol) propyl ether, or a di(N,N-dimethylamino ethylene glycol) ether at about 70° C. for about 30 minutes. The pre-alkylated barium compound is treated with the organolithium compound and heated to about 70° C. for about 10 minutes. This catalyst system is added to the reaction followed by the polar modifiers. The polar modifiers can be added to the monomer pre-mix separately or with the catalyst system. Preferably, the polymerizations of this invention are initiated by adding an organolithium initiator, an organoaluminum compound, a barium salt of a cyclic alcohol, and a modifier selected from the group consisting of alcohols, amines, phosphates, phosphites and thiols. The polymerization will preferably also be carried out in the presence of a lithium salt of a cyclic alcohol and can be carried out utilizing batch, semi-continuous or continuous techniques.

The organolithium initiators employed in the process of this invention include the monofunctional and multifunctional types known for polymerizing the monomers described herein. The multifunctional organolithium initiators can be either specific organolithium compounds or can be multifunctional types which are not necessarily specific compounds but rather represent reproducible compositions of regulable functionality.

The amount of organolithium initiator utilized will vary with the molecular weight that is desired for the trans polymers being synthesized. However, as a general rule from 0.01 to 3 phm (parts per 100 parts by weight of monomer) of an organolithium initiator will be utilized. In most cases, from 0.01 to 0.3 phm of an organolithium initiator will be utilized with it being preferred to utilize 0.025 to 0.07 phm of the organolithium initiator.

The multifunctional initiators which can be used include those prepared by reacting an organomonolithium compounded with a multivinylphosphine or with a multivinylsilane, such a reaction preferably being conducted in an inert diluent such as a hydrocarbon or a mixture of a hydrocarbon and a polar organic compound. The reaction between the multivinylsilane or multivinylphosphine and the organomonolithium compound can result in a precipitate which can be solubilized if desired, by adding a solubilizing monomer such as a conjugated diene or monovinyl aromatic compound, after reaction of the primary components. Alternatively, the reaction can be conducted in the presence of a minor amount of the solubilizing monomer. The relative amounts of the organomonolithium compound and the multivinylsilane or the multivinylphosphine preferably should be in the range of about 0.33 to 4 moles of organomonolithium compound per mole of vinyl groups present in the multivinylsilane or multivinylphosphine employed. It should be noted that such multifunctional initiators are commonly used as mixtures of compounds rather than as specific individual compounds.

Exemplary organomonolithium compounds include ethyllithium, isopropyllithium, n-butyllithium, sec-butyllithium, tert-octyllithium, n-eicosyllithium, phenyllithium, 2-naphthyllithium, 4-butylphenyllithium, 4-tolyllithium, 4-phenylbutyllithium, cyclohexyllithium, and the like.

Exemplary multivinylsilane compounds include tetravinylsilane, methyltrivinylsilane, diethyldivinylsilane, di-n-dodecyldivinylsilane, cyclohexyltrivinylsilane, phenyltrivinylsilane, benzyltrivinylsilane, (3-ethylcyclohexyl) (3-n-butylphenyl)divinylsilane, and the like.

Exemplary multivinylphosphine compounds include trivinylphosphine, methyldivinylphosphine, dodecyldivinylphosphine, phenyldivinylphosphine, cyclooctyldivinylphosphine, and the like.

Other multifunctional polymerization initiators can be prepared by utilizing an organomonolithium compound, further together with a multivinylaromatic compound and either a conjugated diene or monovinylaromatic compound or both. These ingredients can be charged initially, usually in the presence of a hydrocarbon or a mixture of a hydrocarbon and a polar organic compound as a diluent. Alternatively, a multifunctional polymerization initiator can be prepared in a two-step process by reacting the organomonolithium compound with a conjugated diene or monovinyl aromatic compound additive and then adding the multivinyl aromatic compound. Any of the conjugated dienes or monovinyl aromatic compounds described can be employed. The ratio of conjugated diene or monovinyl aromatic compound additive employed preferably should be in the range of about 2 to 15 moles of polymerizable compound per mole of organolithium compound. The amount of multivinylaromatic compound employed preferably should be in the range of about 0.05 to 2 moles per mole of organomonolithium compound.

Exemplary multivinyl aromatic compounds include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, m-diisopropenyl benzene, p-diisopropenyl benzene, 1,3-divinyl-4,5,8-tributylnaphthalene, and the like. Divinyl aromatic hydrocarbons containing up to 18 carbon atoms per molecule are preferred, particularly divinylbenzene as either the ortho, meta, or para isomer, and commercial divinylbenzene, which is a mixture of the three isomers, and other compounds such as the ethylstyrenes, also is quite satisfactory.

Other types of multifunctional initiators can be employed such as those prepared by contacting a sec- or tert-organo-monolithium compound with 1,3-butadiene, at a ratio of about 2 to 4 moles of the organomonolithium compound per mole of the 1,3-butadiene, in the absence of added polar material in this instance, with the contacting preferably being conducted in an inert hydrocarbon diluent, though contacting without the diluent can be employed if desired.

Alternatively, specific organolithium compounds can be employed as initiators, if desired, in the preparation of polymers in accordance with the present invention. These can be represented by $R(Li)_x$ wherein R represents a hydrocarbyl radical containing from 1 to 20 carbon atoms, and wherein x is an integer of 1 to 4. Exemplary organolithium compounds are methyllithium, isopropyllithium, n-butyllithium, sec-butyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butane, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

The organoaluminum compounds that can be utilized typically have the structural formula:

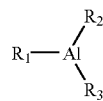

in which $R_1$ is selected from the group consisting of alkyl groups (including cycloalkyl), aryl groups, alkaryl groups, arylalkyl groups, alkoxy groups, and hydrogen; $R_2$ and $R_3$ being selected from the group consisting of alkyl groups (including cycloalkyl), aryl groups, alkaryl groups, and arylalkyl groups. Some representative examples of organoaluminum compounds that can be utilized are diethyl aluminum hydride, di-n-propyl aluminum hydride, di-n-butyl aluminum hydride, diisobutyl aluminum hydride, diisobuty aluminum hydride, diphenyl aluminum hydride, diptolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, and benzyl n-propyl aluminum hydride, and benzyl isopropyl aluminum hydride, diethylaluminum ethoxide, disobutylaluminum ethoxide, dipropylaluminum methoxide, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. The preferred organoaluminum compounds include triethyl aluminum (TEAL), tri-n-propyl aluminum, triisobutyl aluminum (TIBAL), trihexyl aluminum and diisobutyl aluminum hydride (DIBA-H).

The barium salts of cyclic alcohols that can be used can be mono-cyclic, bi-cyclic or tri-cyclic and can be aliphatic or aromatic. They can be substituted with 1 to 5 hydrocarbon moieties and can also optionally contain hetero-atoms. For instance, the barium salt of the cyclic alcohol can be a metal salt of a di-alkylated cyclohexanol, such as 2-isopropyl-5-methylcyclohexanol or 2-t-butyl-5-methylcyclohexanol. These barium salts are preferred because they are soluble in hexane. Barium salts of disubstituted cyclohexanol are highly preferred because they are soluble in hexane. Barium mentholate is the most highly preferred barium salt of a cyclic alcohol that can be employed in the practice of this invention. Barium salts of thymol can also be utilized. The barium salt of the cyclic alcohol can be prepared by reacting the cyclic alcohol directly with the barium or another barium source, such as barium hydride, in an aliphatic or aromatic solvent.

The lithium salts of cyclic alcohols that can be used can be used can be mono-cyclic, bi-cyclic or tri-cyclic and can be aliphatic or aromatic. They can be substituted with 1 to 5 hydrocarbon moieties and can also optionally contain hetero-atoms. For instance, the lithium salt of the cyclic alcohol can be a lithium salt of a di-alkylated cyclohexanol, such as 2-isopropyl-5-methylcyclohexanol or 2-t-butyl-5-methylcyclohexanol. These lithium salts are preferred because they are soluble in hexane. Lithium salts of disubstituted cyclohexanol are highly preferred because they are soluble in hexane. Lithium mentholate is the most highly preferred lithium salt of a cyclic alcohol that can be employed in the practice of this invention. Lithium salts of thymol can also be utilized. The lithium salt of the cyclic alcohol can be prepared by reacting the cyclic alcohol directly with the lithium or another lithium source, such as lithium hydride, in an aliphatic or aromatic solvent.

The modifier employed in practicing the process of this invention will be selected from the group consisting of alcohols, phosphates, phosphites, amines, and thiols, as well as water. The modifier can be aliphatic or aromatic. Some representative examples of alcohols that can be used include phenol, normal-butyl alcohol, and iso-butyl alcohol. Normal-butyl thiol is a representative example of a thiol that can be used as the modifier in practicing this invention.

The molar ratio of the organoaluminum compound to the organolithium compound will be within the range of about 0.3:1 to about 8:1. It will preferably be within the range of about 0.5:1 to about 5:1 and will most preferably be within the range of about 1.2:1 to about 2:1. The molar ratio of the barium salt of the cyclic alcohol to the organolithium compound will be within the range of about 0.1:1 to salt of the cyclic alcohol to the organolithium compound will preferably be within the range of about 0.15:1 to about 1.2:1 and will most preferably be within the range of about 0.2:1 to about 0.6:1. The molar ratio of the lithium salt of the cyclic alcohol to the organolithium compound will be within the range of about 0.15:1 to about 4:1. The molar ratio of the lithium salt of the cyclic alcohol to the organolithium compound will preferably be within the range of about 0.25:1 to about 2.5:1 with ratios within the range of about 0.6:1 to about 1:1 being most preferred. The molar ratio of the modifier to the barium compound will typically be within the range of about 0.1:1 to 20:1. The molar ratio of the modifier to the barium compound will preferably be within the range of about 0.5:1 to 10:1. The molar ratio of the modifier to the barium compound will most preferably be within the range of about 0.8:1 to 4:1.

The polymerization temperature utilized can vary over a broad temperature range of from about 20° C. to about 120° C. In most cases, a temperature within the range of about 40° C. to about 100° C. will be utilized. It is typically most preferred for the polymerization temperature to be within the range of about 60° C. to about 90° C. Lower polymerization temperatures generally result in higher polymer melting points. However, the glass transition temperature of the trans-1,4-polybutadiene does not change as a function of polymerization temperature. The pressure used will normally be sufficient to maintain a substantially liquid phase under the conditions of the polymerization reaction.

The polymerization is conducted for a length of time sufficient to permit substantially complete polymerization of monomers. In other words, the polymerization is normally carried out until high conversions are attained. The polymerization can then be terminated using a standard technique. The polymerization can be terminated with a conventional noncoupling type of terminator, such as water, an acid, a lower alcohol, and the like or with a coupling agent. For instance, coupling agents can be used in order to improve the cold flow characteristics of the trans-1,4-polybutadiene rubber and rolling resistance of tires made therefrom. It also leads to better processability and other beneficial properties. A wide variety of compounds suitable for such purposes can be employed. Some representative examples of suitable coupling agents include: multivinylaromatic compounds, multiepoxides, multiisocyanates, multiimines, multialdehydes, multiketones, multihalides, multianhydrides, multiesters which are the esters of polyalcohols with monocarboxylic acids, and the diesters which are esters of monohydric alcohols with dicarboxylic acids, and the like.

After the copolymerization has been completed, the trans-1,4-polybutadiene can be recovered from the organic solvent. The trans-1,4-polybutadiene can be recovered from the organic solvent and residue by means such as decantation, filtration, centrification and the like. It is often desirable to precipitate the trans-1,4-polybutadiene from the organic solvent by the addition of lower alcohols containing from about 1 to about 4 carbon atoms to the polymer solution. Suitable lower alcohols for precipitation of the segmented polymer from the polymer cement include methanol, ethanol, isopropyl alcohol, normal-propyl alcohol and t-butyl alcohol. The utilization of lower alcohols to precipitate the trans-1,4-polybutadiene from the polymer cement also "kills" the living polymer by inactivating lithium end groups. After the trans-1,4-polybutadiene is recovered from the solution, steam stripping can be employed to reduce the level of volatile organic compounds in the segmented polymer.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

In this experiment a three neck flask equipped with a thermometer, water condenser with a Dean Stark water trap, and a nitrogen inlet was charged with 3 liters of anhydrous ethyl benzene. Then, 1 mole of barium hydroxide mono hydrate was added to the flask with constant stirring. To this heterogeneous solution was added 2 moles of one of the following alcohols: (a) di(ethylene glycol) ethyl ether, (b) di(N,N-dimethyl/amino ethylene glycol) ethyl ether, or (c) di(ethylene glycol) hexyl ether. The ethyl benzene solvent was brought to reflux temperature at which it was maintained until 2 moles of water were removed. The resulting barium salt of the organic compound was soluble in the ethyl benzene and the resulting homogenous solution was used in each of the following examples.

EXAMPLE 2

In this experiment a styrene-butadiene rubber having a high trans-microstructure content was synthesized utilizing the catalyst system of this invention. In the procedure used, a 500 gallon (1893 liter) reactor was charged with 1900 pounds (862 kg) of monomer premix solution containing 1,3-butadiene and styrene in hexane. The monomer premix solution contained 65% 1,3-butadiene and 35% styrene monomer. The monomer premix solution charged into the reactor a small amount of moisture (0.5 ppm of water). The reactor was heated to 170° F. (77° C.) and the catalyst was charged into the reactor at 0.35 mmoles per 100 grams of monomer. The catalyst was made beforehand with barium di(ethylene glycol) ethyl ether that has been alkylated with trioctyl aluminum and mixed with n-butyllithium. The temperature of the reactor climbed steadily to 245° F. (118° C.) and the cooling bypass was opened completely to control the reactor temperature. After three hours of reaction time the reactor was cooled and the cement was desolventized to recover the polymer product synthesized. Then, the polymer product was analyzed by NMR and the styrene conversion was determined to be 76%. The residual styrene monomer can be recovered in commercial operations to make the process economical.

EXAMPLE 3

In this experiment the same procedure was followed as in Example 2 except that the moisture content of the premix was 25 ppm of water. The catalyst charge was the same as in the above example. The temperature of the reactor was raised to 170° F. (77° C.) and all the catalyst was added. The reactor temperature reached 224° F. (107° C.) and was held constant through the reaction without any temperature surge as observed in Example 2 where the moisture content was 0.5 ppm. The presence of 25 ppm of water moderated the reaction temperature and increased the level of styrene conversion. The styrene conversion increased from 27% to 31% suggesting that the overall conversion increased from 77% to 88%.

EXAMPLE 4

The same procedure was followed as in Example 2 and the moisture content was again 0.5 ppm of water. The temperature behaved the same as in Example 2. After three hours of reaction time the reactor was cooled to 200° F. (93° C.) and the reactor pressure was reduced to 35 psi. The additional 1,3-butadiene monomer premix was added to the reactor and the temperature was raised to 245° F. (118° C.). After one hour of reaction time, the styrene conversion went up to 33%. The styrene conversion went up to 94% which is an increase of 17%. By utilizing the procedure delineated in this example, the residual styrene monomer does not need to be recovered in commercial applications as would be the case if the system described in Example 2 was implemented.

EXAMPLE 5

In this experiment an alkylated barium catalyst was prepared by the alkylation of barium di(ethylene glycol) ethyl ether. In the procedure used, a 28 oz (828.1 ml) bottle was charged with octyl-aluminium/barium di(ethylene glycol) ethyl ether in ethylbenzene at a ratio of barium/aluminum of 1/4 and was subsequently heated to 70° C. (158° F.) for 30 minutes. In the procedure used a 28 oz (828.1 ml) bottle was charged with 400 ml of 1.0 molar tri-octyl aluminum (400 mmoles). Then 100.0 ml of a 1.0 molar solution of barium di(ethylene glycol) ethyl ether in ethyl benzene (Ba/Al 1:4) was added. This homogenous mixture was shaken well and the container was placed in a constant temperature bath which was held at 70° C. (158° F.) for 30 minutes. The resulting 0.20 molar homogenous reddish-orange solution of the alkylated barium was brought together with n-butyllithium at a Ba/Li ratio of 1:3 before it is charged into the reactors and used as a catalyst for the preparation of the trans-SBR, BR, IBR and SIBR. The polar modifiers(X) are usually added with the premix at a Ba/Al/Li/X ratio of 1:4:3:1.

EXAMPLE 6

In the procedure utilized in this experiment, 2000.0 grams of a premix containing 20% styrene and 80% butadiene was charged into a one gallon (3.80 liter) reactor. Then 7 ml of a 0.20 molar solution of the alkylated barium solution followed by 4.20 ml of a 1.0 molar solution of the butyllithium was charged into the reactor at a Ba:Li ratio of 1:3. The polymerization was carried out at 90° C. (194° F.) for three hours. Analysis for residual monomer was done by gas chromatography to determine the reaction rate and conversion. The GC analysis indicated that after three hours of reaction time the 1,3-butadiene was converted to 95% and the styrene was converted to 65%. The polymer cement was stabilized with antioxidants and the polymer cements were put in an air oven to remove all the hexane solvents. The dry polymer was analyzed by gas phase chromatography (GPC), nuclear magnetic resonance spectrometry (NMR), and differential scanning calorimetry (DSC). The SBR produced by this process had a $T_g$ of 12.5° C. and a Mooney ML-4 viscosity of 89. NMR analysis showed that this polymer had a 1,2-microstructure content of 4.5%, a 1,4 microstructure content of 95.5%, and a trans-microstructure content of 78%, based on the polybutadiene portion of the resulting SBR. The number average molecular weight (Mn) of the polymer was found to be 185,000 and the weight average molecular weight (Mw) was found to be 264,000.

EXAMPLE 7

In a continuous two one gallon (3.80 liter) reactor chain the polymerization of a butadiene/styrene premix in hexane was conducted. The premix was pumped into the first reactor of the chain at a rate of 200 grams per minute and fed into the second reactor of the chain at the same rate. Both reactor temperatures were kept at 195° F. (91° C.). Example 8 below shows the results of these runs.

EXAMPLE 8

In this experiment preparation of trans-styrene butadiene rubber containing about 20% styrene and 80% butadiene was synthesized in the presence of dodecyl phenolate barium salt and tertiary-butyl alcohol and tetramethyl ethylene diamine (TMEDA) in a ratio of Ba/Al/Li/X/Y of 1:4:3:1:1 (wherein X represents TMEDA and wherein Y represents tertiary-butyl alcohol). In the procedure used a one gallon (3.80 liter) reactor equipped with a mechanical stirrer and under nitrogen atmosphere was charged with 200 grams of 20% styrene in hexane solution (40 grams of styrene equivalents to 21.2% of 198 grams of premix) and 200 grams of a 80% butadiene solution (160 grams of butadiene equivalent to 727 grams of 22% premix). To this solution was added 1.85 ml of 0.27 molar solution of barium dodecylphenolate followed by 2.55 ml of hexyllithium (0.98 molar), and 4.0 ml of tri-N-octyl-aluminium (0.5 molar) and 1.09 ml of tertiary-butyl alcohol (0.98 molar). To this solution was then added 1.0 mmole of tertamethylethylene diamine(TMEDA). The reaction mixture was heated to 99° C. (210° F.) and turned bright orange indicating that the polymerization had taken place. The reaction was allowed to proceed for three hours. After 200 minutes, all the butadiene was converted and 76.9% of the styrene was converted. The reaction was neutralized with isopropanol and the polymer cements were stabilized with antioxidants and placed in an oven maintained at 50° C. (122° F.) to remove all the solvents. $C^{13}$ NMR analysis showed that the 1,2-microstructure content was 6.2% and the 1,4-microstructure content was 93.85 out of which the trans content was 74.3% and the styrene content was 15.3% (76.8% conversion). The DSC analysis showed that the polymer had a Tg of −85° C. and a Mooney ML-4 viscosity of 47. GPC showed that the polymer had a Mn of 70,000 g/mol and a Mw of 214,000 g/mol. The fact that the polymer has no melting peaks indicates that all the styrene is totally random.

EXAMPLE 9

In this experiment trans-styrene-butadiene rubber having a bound styrene content of about 20% was synthesized in the presence of an aliphatic alcohol. The Ba/Al/Li/X ratio was 1:4:3:1 wherein X represents the aliphatic alcohol. In the procedure used, a one gallon (3.80 liter) reactor was charged with 189 grams of hexane premix containing 21.2% styrene and 717.5 grams of hexane premix containing 22.6% of butadiene. To this homogenous mixture was added 0.9 ml of the barium salt of dodecylphenolate (0.27 molar), followed by the addition of 2.55 ml of n-butyllthium (0.098 molar). To this solution was then added 0.98 ml of trioctylaluminium (1.0 molar) and 0.98 ml of a one molar solution of tertiary-butyl alcohol. The reactor temperature was raised to 90° C. (194° F.) and samples were then taken to determine the reaction rates and the residual monomer conversion. After 200 minutes the butadiene was converted to 99% and the styrene was converted to 70%. The polymer cements were stabilized with antioxidants and the polymer was dried in a hot oven and the resulting polymer was analyzed. The DSC showed that this polymer had a glass-transition temperature of –86° C. and a crystalline melting point (Tm) at –47° C. and melting temperature of 12° C. GPC showed that this polymer had a Mn of 69,000 g/mol.

EXAMPLE 10

In this experiment trans-styrene-butadiene rubber having a bound styrene content of about 20% was synthesized in the presence of an aliphatic alcohol wherein the Ba/Al/Li/X ration was 1:4:3:2. The same procedure was followed as in Example 9 except the ratio of the tertiary-butyl alcohol was increased to twice the molar ratios of barium. At the reaction time of 200 minutes, the styrene conversion increased to 80% as compared to a conversion of only 50% when the reaction was conducted in the absence of alcohol. The conversion achieved in this experiment also compared favorably to a conversion of only 70% when the ratio of alcohol to barium was equal. The polymer glass-transition temperature was –77° C. which indicates that the styrene was totally random and the polymer did not have any melting peaks. GPC showed that this polymer had a Mn of 59,000 g/mol, a Mw of 100,000 g/mol and a very sharp molecular weight distribution.

EXAMPLES 11–20

Examples 11–20 depict the general polymerization procedure of this invention. A preformed catalyst system was utilized in Examples 11–20. The preformed catalyst process consisted of alkylating a barium compound, Bis[2-(2-ethoxyethoxy)ethanolato-O,O',O"]-barium (37.33% in ethyl benzene), with an aluminum alkyl, tri-n-octyl aluminum (50% in hexane). The target Al:Ba ratio was 4:1. Since this ratio largely determines the microstructure of the polymer and this portion of the catalyst is preformed, it is important to take great care in preparing the preform.

The alkylation of barium is carried out in a batch process. The process flow diagram is shown in FIG-1.

The batch was made in a 30-gallon (114 liter), jacketed, agitated reactor. The jacket coolant was glycol, which was circulated with a pump. The glycol was heated with steam when needed. Catalyst components were weighed directly from the vendor cylinders on scales into the reactor. Batch size was calculated to provide enough preformed catalyst for approximately two weeks of polymerization (approximately 20 gallons (76 liters)).

After adding the barium compound to the reactor, the reactor temperature was set at 75° F. (24° C.) to compensate for the exotherm from the reaction of tri-n-octyl aluminum (TNOA) with the barium compound. TNOA was added slowly (~1 lb (0.45 kg)/min) to the reactor using a needle valve. As mentioned above, the alkylation process is exothermic, but only until approximately half of TNOA is added. At that point the exotherm subsides, and the TNOA can be added more quickly. Once the TNOA is added, the temperature was set at 158° F. (70° C.) for thirty minutes. Finally, the alkylated barium was then transferred to a cylinder for use in the polymerization process.

For the batch process, just prior to the batch initiation, the barium/TNOA catalyst was weighed into a smaller cylinder. Then, 15% n-butyl lithium was added to the cylinder at a 3:1 ratio to the barium. This ratio was determined to be the optimum. After the addition, the contents of the cylinder was transferred to a 5-gallon (18.93 liter) reactor and heated at 70° C. (158° F.) for 7 minutes. The contents were then returned to the cylinder to be charged into the 500-gallon (1893 liter) reactor.

In these experiments, the polymer was produced in a 500 gallon (1893 liter) batch reactor. The reactor was equipped with 2 axial flow turbine (AFT) agitators. Premix contained a dilute make-up of styrene/1,3-butadiene in hexane and was dried over two beds of silica gel into a hold vessel. A weighed amount of dried premix was transferred into the reactor. After reactor was heated to a set point, the catalyst was pressured into the reactor. The reactor was then heated slowly until the batch reaction began to exotherm. The reaction was then allowed to run its course. The reaction was monitored for solids and residuals. Information describing each batch and data collected is listed below. All reactions were shortstopped with 1.5 moles of stearic acid per mole of barium. Then, 0.5 phr of Wingstay® K antioxidant was added. Cement from each reaction was saved for subsequent finishing.

TABLE I

| | 500 gallon Batch Reaction Parameters | | | | |
|---|---|---|---|---|---|
| Number | Styrene/ Butadiene by GC | Premix Concentration Calculated | Premix Concentration By GC | Batch Size lbs. | Catalyst Level mmole/100 |
| Example 11 | 33/67 | 20 | 18.66 | 2200 | 0.400 |
| Example 12 | 34/66 | 20 | 20.42 | 2200 | 0.300 |
| Example 13 | 28/72 | 20 | 19.15 | 1900 | 0.270 |
| Example 14 | 22/78 | 18 | 17.47 | 1900 | 0.325 |
| Example 15 | 25/75 | 18 | 17.1 | 1900 | 0.325 |
| Example 16 | 40/60 | 18 | 16.5 | 1900 | 0.325 |
| Example 17 | 33/67 | 18 | 17.1 | 1900 | 0.325 |
| Example 18 | 37/63 | 18 | 17.2 | 1900 | 0.650 |
| Example 19 | 37/63 | 18 | 17.15 | 1900 | 0.400 |
| Example 20 | 38/62 | 18 | 16.37 | 1800 | 0.400 |

TABLE II

Batch Temperature and Pressure Maximums

| Number | Initiation Temperature Degrees F. | Maximum Temperature Degrees F. | Maximum Pressure psig | Batch Reaction Time minutes |
|---|---|---|---|---|
| Example 11 | 185 | 255+ | 83.7 | 120 |
| Example 12 | 125 | 262 | 77.5 | 120 |
| Example 13 | 150 | 242 | 56.8 | 120 |
| Example 14 | 150 | 249 | 64.3 | 105 |
| Example 15 | 150 | 263 | 87.6 | 120 |
| Example 16 | 150 | 244 | 63.9 | 180 |
| Example 17 | 150 | 244 | 77.9 | 180 |
| Example 19 | 150 | 215 | 81.0 | 240 |
| Example 20 | 150 | 240 | 77.0 | 255 |

EXAMPLE 11

In the first batch of high trans-SBR, premix concentration was set at 20% and a ratio of 35/65 was charged. Analysis of premix determined actual concentration charged was 18.66% and a ratio of 33/67. The batch was initiated at 185° F. (85° C.) by charging 0.4 mmoles Ba/100, based on 20% calculated monomer charge. The reaction initiated quickly exotherming to 255° F. (124° C.). The DCS was only ranged to record temperatures up to 255° F. (124° C.) so the highest temperature achieved is unknown. Pressure rose to 83.7 psig (678 kilopascals). Sampling the reaction during the exotherm was difficult. The batch was run for 2 hours and then shortstopped. Polymer data is seen below in Table III.

EXAMPLE 12

Premix concentration was not changed for this batch; it was left at 20% charged, analysis 20.42% with a ratio of 34/66. Initiation of this batch was at 125° F. (52° C.) with a catalyst level of 0.3 mmoles Ba/100. No reaction occurred at this temperature. The temperature was gradually increased and when it reached 160–170° F. (72–77° C.) the reaction began to exotherm on its own. When the reaction reached 190° F. (88° C.), the glycol bypass was opened to try to control the temperature. The highest temperature reached was 262° F. (128° C.).

EXAMPLE 13

Premix concentration was not changed for this batch; it was left at 20% charged, analysis 19.15% with a ratio of 28/72. Reactor level was dropped from 2200 lbs to 1900 lbs (998 kg to 862 kg). Initiation of this batch was at 150° F. (66° C.) with a catalyst level of 0.27 mmole Ba/100. The temperature was gradually increased and when it reached 160–170° F. (72–77° C.) the reaction began to exotherm on its own. The glycol bypass was opened immediately as the reaction started to try to control the temperature. This caused the reaction to die off. The steam bypass had to be opened to reheat the batch. As soon as the reaction hit 170° F. (77° C.), the reactor jacket was put into local control and adjustments to the cooling were done manually. The reaction temperature did rise but only to 242° F. (117° C.) and the pressure peak was 56.8 psig (492 kilopascals).

EXAMPLE 14

In this experiment, premix concentration was dropped to 18% (analysis 17.47) with a ratio of 22/78 SBR premix. Catalyst charge was 0.325 mmole barium/100 monomer. The reaction process was initiated and controlled just like in Example 13. Maximum temperature and pressure are seen in Table II. Residual monomer samples were taken to track the reaction for this batch. The polymer synthesized was characterized with the results of this analysis being reported in Table III, Table IV, Table V and Table IV.

EXAMPLE 15

In this experiment the fifth 500-gallon (1893 liter) batch of trans-SBR was synthesized. In the procedure used, an 18% monomer premix solution (25/75 styrene/1,3-butadiene) was charged into the reactor along with 0.325 mmoles barium/100 monomer and the batch polymerization was initiated at 150° F. (66° C.). The level in the reactor was 1900 lbs. (862 kg). The reactor was heated to about 170° F. (77° C.) after approximately 25 minutes at which point the reaction temperature began to climb on it own. The temperature of the jacket was then adjusted remotely. Maximum temperature and pressure were reached at 60 minutes into the run at a temperature of 263° F. (128° C.) and a pressure 87.6 psig (704 kilopascals). The batch polymerization was run for a total 120 minutes. The polymer synthesized was characterized with the results of this analysis being reported in Table III, Table IV, Table V and Table IV.

EXAMPLE 16

In this experiment the sixth 500-gallon (1893 liter) batch of trans-SBR was synthesized. The monomer premix solution was adjusted to a styrene/butadiene ratio 40/60. The concentration was targeted at 18%, but chemical analysis showed a concentration of only 16.5%. The same catalyst level as the previous batch (0.325 mmoles barium/100 monomer) was used. The reactants charged into the reactor had a total weight of 1900 lbs (862 kg). The catalyst was charged at 150° F. (66° C.) and the reaction was controlled as in Example 15 batch. A maximum temperature of 244° F. (118° C.) was reached 45 minutes into the polymerization at a maximum pressure of 63.9 psig (541 kilopascals) at 38 minutes. This batch polymerization was run for a total of 180 minutes.

EXAMPLE 17

In this experiment the seventh 500-gallon (1893 liter) batch of trans-SBR was synthesized. This batch polymerization was to be a duplicate of the batch in Example 12. The premix charge was 18% (analysis 17.1) of 33/67 SBR. Due to the time interval between the two batches, a slightly higher catalyst charge than the original batch was run (0.325 mmoles barium/100 monomer). The batch temperature and quantities were set as in Example 12. The temperature was controlled manually. Data for this batch is reported in Tables III–VI. As can be seen, the physical properties of the trans-SBR made in this experiment were very similar to those of the polymer made in Example 12.

EXAMPLE 18

In this experiment the eighth 500-gallon (1893 liter) batch of trans-SBR was synthesized. The continuous polymerization process attempted in this experiment utilized a small amount of TMEDA. In this batch, TMEDA was added to the premix in a 1:1 mole ratio with the barium. This batch did not initiate. Original catalyst level was 0.325 mmoles barium/100 monomer. An additional 0.325 mmoles barium/100 monomer was added at 180 minutes into the run in an attempt to start the reaction. Sixty minutes after the second addition of catalyst, the reaction was scrapped.

EXAMPLE 19

In this experiment the ninth 500-gallon (1893 liter) batch of trans-SBR was synthesized. When the monomer premix solution was sampled for composition (37/63 SBR) and concentration (17.2), it was found to contain 18 ppm water. The catalyst level was increased to 0.4 mmoles barium/100 monomer. The batch polymerization was initiated at 150° F. (66° C.) with the amount of reactants charged into the reactor totaling 1800 lbs (816 kg). The reactor was heated to a temperature of about 170° F. (77° C.) at which point the reaction temperature began to climb on it own. The jacket temperature was then adjusted remotely. This batch did not exotherm as did previous batches. The temperature climbed to about 215° F. (102° C.) and leveled off. The reaction was run for about 5 hours and then stopped. The polymer synthesized was characterized with the results of this analysis being reported in Table III, Table IV, Table V and Table IV.

EXAMPLE 20

In this experiment the tenth 500-gallon (1893 liter) batch of trans-SBR was synthesized. The monomer premix solution charged into the reactor contained 18% (analysis 16.37%) monomers (38/62 styrene/1,3-butadiene). A higher catalyst level was used (0.4 mmoles barium/100 monomer) since the previous batch did not run well. However, this batch initiated quickly. The jacket temperature was controlled accordingly. This batch reached a maximum temperature of 240° F. (116° C.) in 41 minutes.

Since this batch ran so well, 30% butadiene premix was made up during the reaction process and dried. Then, 100 pounds (45 kg) of dried premix was added to the batch after the batch had run for 165 minutes. Most of the reaction at this point was complete and temperature had leveled around 200° F. (93° C.). The batch was run for an additional 90 minutes before being shortstopped. Residuals listed below show that more styrene was incorporated after the addition. This was not the optimum conditions for this addition. Since the premix was prepared and added during the run, the reaction had cooled off to 202° F. (94° C.) from 240° F. (116° C.). Then, 30% premix was not tested prior to addition to the batch. However, even though conditions were not optimum, an additional 5% styrene conversion was achieved. This technology can be beneficially implemented in both batch and continuous processes for high levels of styrene incorporation.

All batch data is seen in the tables below:

TABLE III

Batch Reaction Final Cement Properties

| Number | ML/4 | Tg Onset | Tg midpoint | % Styrene by NMR | % Cis by NMR | % Trans by NMR | % Vinyl by NMR |
|---|---|---|---|---|---|---|---|
| Example 11 | 29.5 | −77.9 | −73.1 | 27.4 | 12.7 | 55.5 | 4.4 |
| Example 12 | 67.9 | −77.7 | −72.7 | 28.2 | 12.1 | 55.2 | 4.5 |
| Example 13 | 119.2 | −77.3 | −71.1 | 21.3 | 12.8 | 62 | 3.9 |
| Example 14 | 80.9 | −80.2 | −74.6 | 18.5 | 13.8 | 63.6 | 4.1 |
| Example 15 | 101.2 | −76.4 | −68.8 | 18.3 | 14.9 | 62.5 | 4.3 |
| Example 16 | 49.0 | −72.7 | −65.8 | 32.9 | 10.7 | 52.4 | 3.9 |
| Example 17 | 66.4 | −76.4 | −67.4 | 27.7 | 12.5 | 55.7 | 4.2 |
| Example 18 | 91.7 | −74.7 | −69.1 | 31 | 10.8 | 54.1 | 4.1 |
| Example 19 | 43.7 | −74.5 | −68.8 | 32.9 | 11.0 | 51.7 | 4.3 |

TABLE IV

Batch Reaction RPA Data

| Number | beta | R square |
|---|---|---|
| Example 11 | 0.142 | 0.9360 |
| Example 12 | 0.151 | 0.9661 |
| Example 13 | 0.187 | 0.9946 |
| Example 14 | 0.173 | 0.9871 |
| Example 15 | 0.161 | 0.9729 |
| Example 16 | 0.128 | 0.9127 |
| Example 17 | 0.146 | 0.9767 |
| Example 19 | 0.172 | 0.9764 |
| Example 20 | 0.127 | 0.9670 |

TABLE V

| ID | wt % St | %1 S | %2–4 S | % >= 5 S | % 1,2-Bd | % cis 1,4-Bd | % trans 1,4-Bd |
|---|---|---|---|---|---|---|---|
| Example 17 | 27.7 | 9.3 | 15.5 | 2.9 | 4.2 | 12.5 | 55.7 |
| 100% Bd | | | | | 5.8 | 17.2 | 77.0 |
| Example 19 | 31.0 | 8.9 | 18.5 | 3.6 | 4.1 | 10.8 | 54.1 |
| 100% Bd | | | | | 5.9 | 15.6 | 78.5 |
| Example 20 | 32.9 | 9.0 | 19.2 | 4.7 | 4.3 | 11.0 | 51.7 |
| 100% Bd | | | | | 6.5 | 16.5 | 77.1 |

TABLE VI

| ID | wt % St | %1 S | %2–4 S | % >= 5 S | % 1,2-Bd | % 1,4-Bd | % trans 1,4-Bd | % cis 1,4-Bd |
| --- | --- | --- | --- | --- | --- | --- | --- | --- |
| Example 15 | 18.3 | 8.3 | 9.1 | 0.9 | 4.3 | 77.4 | 62.5 | 14.9 |
| 100% Bd | | | | | 5.3 | 94.7 | 76.4 | 18.3 |
| Example 16 | 32.9 | 14.9 | 16.3 | 1.6 | 3.9 | 63.2 | 52.4 | 10.8 |
| 100% Bd | | | | | 5.9 | 94.1 | 78.1 | 16.0 |

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A process for synthesizing trans-1,4-polybutadiene which comprises polymerizing 1,3-butadiene monomer in the presence of a catalyst system which is comprised of (a) an organolithium compound, (b) a barium compound, (c) an organoaluminum compound, (d) water, and (e) a lithium salt of a cyclic alcohol, wherein the polymerization is conducted in the presence of 10 ppm to 100 ppm of the water.

2. A process as specified in claim 1 wherein the polymerization temperature is within the range of about 200° C. to about 120° C.

3. A process as specified in claim 1 wherein the polymerization temperature is within the range of about 40° C. to about 100° C. and wherein the polymerization is conducted in the presence of 20 ppm to 75 ppm of water.

4. A process as specified in claim 1 wherein the polymerization temperature is within the range of about 60° C. to about 90° C. and wherein the polymerization is conducted in the presence of 25 ppm to 50 ppm of water.

5. A process as specified in claim 2 wherein the molar ratio of the organoaluminum compound to the organolithium compound is within the range of about 0.3:1 to about 8:1; wherein the molar ratio of the barium compound to the organolithium compound is within the range of about 0.1:1 to about 1.8:1; and wherein the molar ratio of the lithium salt of the cyclic alcohol to the organolithium compound is within the range of about 0.15:1 to about 4:1.

6. A process as specified in claim 3 wherein the molar ratio of the organoaluminum compound to the organolithium compound is within the range of about 0.5:1 to about 5:1; wherein the molar ratio of the barium compound to the organolithium compound is within the range of about 0.15:1 to about 1.2:1; and wherein the molar ratio of the lithium salt of the cyclic alcohol to the organolithium compound is within the range of about 0.25:1 to about 2.5:1.

7. A process as specified in claim 4 wherein the molar ratio of the organoaluminum compound to the organolithium compound is within the range of about 1.2:1 to about 2:1; wherein the molar ratio of the barium compound to the organolithium compound is within the range of about 0.2:1 to about 0.6:1; and wherein the molar ratio of the lithium salt of the cyclic alcohol to the organolithium compound is within the range of about 0.6:1 to about 1:1.

8. A process as specified in claim 6 wherein the organolithium compound is an alkyl lithium compound.

9. A process as specified in claim 7 wherein the organolithium compound is n-butyllithium.

10. A process as specified in claim 6 wherein the barium compound is barium thyinolate.

11. A process as specified in claim 6 wherein the barium compound is barium mentholate.

12. A process as specified in claim 6 wherein 1,3-butadiene monomer is polymerized in a hydrocarbon solvent, and wherein the polymerization is conducted in the absence of amines.

13. A process as specified in claim 6 wherein the organoaluminum compound is utilized at a level which is within the range of 0.01 phm to 0.1 phm.

14. A process as specified in claim 1 which comprises copolymerizing styrene monomer with the 1,3-butadiene monomer to produce a trans-styrene-butadiene rubber having a glass transition temperature which is within the range of −75° C. to −65° C. and a trans-microstructure content which is within the range of 50% to 65% as determined by nuclear magnetic resonance spectrometry.

15. A process as specified in claim 1 wherein the polymerization is conducted in the presence of a vinyl aromatic monomer to produce a rubbery copolymer of the 1,3-butadiene monomer and the vinyl aromatic monomer, wherein the rubbery copolymer has a high trans-microstructure content of at least about 50%.

* * * * *